(12) United States Patent
Naghi et al.

(10) Patent No.: US 6,435,692 B1
(45) Date of Patent: *Aug. 20, 2002

(54) APPARATUS AND METHOD FOR ILLUMINATING A PORTABLE ELECTRONIC OR COMPUTING DEVICE

(75) Inventors: David Naghi, Los Angeles; Gilbert Fregoso, Santa Ana, both of CA (US)

(73) Assignee: Technology Creations, Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/685,420

(22) Filed: Oct. 10, 2000

Related U.S. Application Data

(63) Continuation-in-part of application No. 09/553,781, filed on Apr. 21, 2000, now Pat. No. 6,260,984, which is a continuation-in-part of application No. 09/330,322, filed on Jun. 11, 1999, now Pat. No. 6,186,636.

(51) Int. Cl.[7] ............................................. F21V 33/00
(52) U.S. Cl. ..................... 362/109; 362/85; 362/253; 362/186; 362/311; 362/800
(58) Field of Search ........................ 362/84, 85, 253, 362/109, 198, 186, 311, 800; 439/502, 504

(56) References Cited

U.S. PATENT DOCUMENTS

| | | |
|---|---|---|
| 4,312,507 A | 1/1982 | Smith et al. |
| 5,091,832 A | 2/1992 | Tortola et al. |
| 5,122,937 A | 6/1992 | Stoudemire |
| 5,122,941 A | 6/1992 | Gross et al. |
| 5,136,477 A | 8/1992 | Lemmey |
| 5,172,974 A | 12/1992 | Riban |
| 5,183,325 A | 2/1993 | Hurdle |
| 5,203,622 A | 4/1993 | Sottile |
| 5,379,201 A | 1/1995 | Friedman |
| 5,486,986 A | 1/1996 | Brada |
| 5,590,950 A | 1/1997 | Hildebrand |
| 5,615,945 A | 4/1997 | Tseng |
| 5,707,137 A | 1/1998 | Hon |
| 5,803,572 A | 9/1998 | Brada |
| 5,868,487 A | 2/1999 | Polley et al. |
| 5,899,553 A | 5/1999 | Howell |
| 6,273,581 B1 | 8/2001 | Neiser .................... 362/109 |

FOREIGN PATENT DOCUMENTS

| | | |
|---|---|---|
| GB | 2 113 818 A | 12/1981 |
| WO | WO 92/06327 | 4/1992 |

OTHER PUBLICATIONS

"Ultimate Palmtop Computer Lights®" internet web page printout; http://www.std.com/sfl/3.pct.html; printed Mar. 2, 2000.

(List continued on next page.)

*Primary Examiner*—Sandra O'Shea
*Assistant Examiner*—Ali Alavi
(74) *Attorney, Agent, or Firm*—Procopio, Cory, Hargreaves & Savitch, LLP

(57) ABSTRACT

An apparatus and method for illuminating a display screen located in a top portion of a handheld portable video game device having a port in electrical connection with a power source. The apparatus includes a plug for plugging the apparatus into the port, a body connected to the plug, the body adapted to be detachably mounted to the top portion of the handheld portable video game device, and a light emitting diode ("LED") attached to the body and to be electrically connected to the utility port through the plug and the body. The LED is powered by the power source so as to illuminate the display screen of the handheld portable video game device when the apparatus is plugged into the port. The method includes the steps of providing the disclosed apparatus, plugging the plug into the port, mounting the body to the top portion of the device, and illuminating the device.

53 Claims, 5 Drawing Sheets

OTHER PUBLICATIONS

Book light product internet web page printout; http://store1.yimg.com/I/parksherman_1550_902141; printed Mar. 2, 2000.

"The Ittybitty Book Light" internet web page printout; http://www.zelco.com/10013.jpg; printed Mar. 2, 2000.

Sierra Gold Marketing "SGM28367" Clip On Light product web page printout; http://www.sgm.simplenet.com/boutique/special/sgm28367.htm; printed Mar. 2, 2000.

Amazon.com product web page printout for "Adventure Book Light and Flashlight" by Lumatec; http://www.amazon.com/exec/obidos/ASIN/b00000IJZM/104–9549104–0986847; printed Mar. 2, 2000.

Igo.com product web page printout for "NBL–100 Notebook Light" by Interex; http://www.igo.com/cgi–bin/ncommerce3/ProductDisplay?prmenbr=1&prrfnbr–522530; printed Jul. 21, 2000.

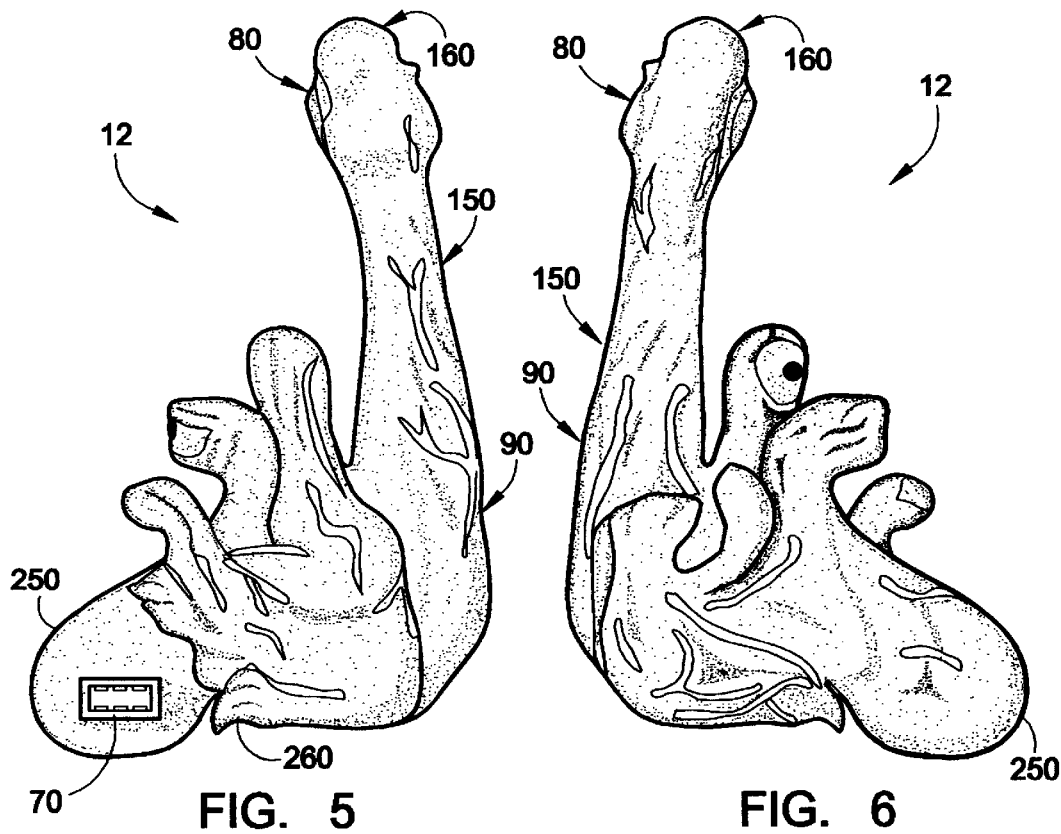
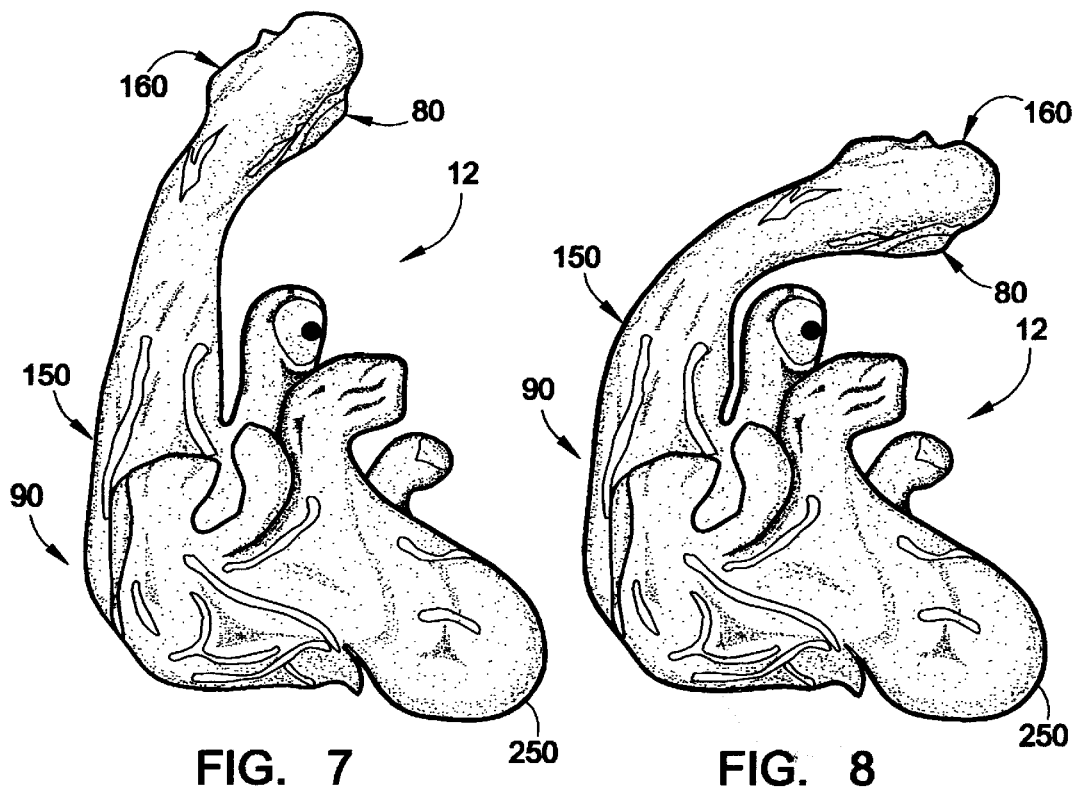

APPARATUS AND METHOD FOR ILLUMINATING A PORTABLE ELECTRONIC OR COMPUTING DEVICE

CROSS REFERENCE TO RELATED APPLICATIONS

This is a continuation-in-part of U.S. patent application Ser. No. 09/553,781, filed Apr. 21, 2000, and now U.S. Pat. No. 6,260,984, which is a continuation-in-part of U.S. patent application Ser. No. 09/330,322, filed Jun. 11, 1999, which is now U.S. Pat. No. 6,186,636.

FIELD OF THE INVENTION

The present invention relates, in general, to lighting devices and methods for illuminating a portable electronic or computing device, and, in particular, to lighting devices and methods for illuminating a screen of a handheld video game device.

BACKGROUND OF THE INVENTION

The GAME BOY® device sold by Nintendo and the NeoGeo Pocket sold by the SNK Corporation of America are examples of popular hand-held, portable, battery-powered video game devices that presently include a generally flat, liquid crystal display screen. The flat, liquid crystal display screens of these devices Work well in well-lit areas. However, because these screens have not been backlit, when such devices are used in dimly lit areas or at night, it can be difficult, if not impossible, for a user to see anything in the viewing screen.

Add-on illumination devices with their own source of electrical power for illuminating the screen of handheld video game devices have been developed. These devices have been designed to fit onto the handheld video game device or been designed for use in connection with the handheld video game device. However, because such devices use their own source of electrical power, they tend to be rather bulky and heavy. In addition, the second source of electrical power increases cost, creates the possibility of another source of power failure, and requires frequent battery replacement.

SUMMARY OF THE INVENTION

An aspect of the invention includes an apparatus for illuminating a display screen located in a top portion of a handheld portable video game device having a port in to electrical connection with a power source. The apparatus includes a plug for plugging the apparatus into the port, a body connected to the plug, the body adapted to be detachably mounted to the top portion of the handheld portable video game device, and a light emitting diode ("LED") attached to the body and to be electrically connected to the utility port through the plug and the body. The LED is powered by the power source so as to illuminate the display screen of the handheld portable video game device when the apparatus is plugged into the port.

Another aspect of the invention includes a method of illuminating a display screen of a top portion of a handheld portable video game device having a port in electrical connection with a power source. The method includes providing an apparatus including a plug for plugging the apparatus into the port, a body connected to the plug, the body adapted to be detachably mounted to the top portion of the handheld portable video game device, and a light emitting diode ("LED") attached to the body and to be electrically connected to the utility power jack through the plug and the body; coupling the plug of the apparatus with the port of the handheld portable video game device so as to power the light emitting diode; mounting the body to the top portion of the handheld portable video game device; and illuminating the display screen of the handheld portable video game device with the light emitting diode.

Other and further objects, features, aspects, and advantages of the present invention will become better understood with the following detailed description of the accompanying drawings.

BRIEF DESCRIPTION OF THE DRAWINGS

The drawings illustrate the design and utility of preferred embodiments of the present invention, in which:

FIG. 5 is a right side elevational view of the illumination accessory illustrated in FIG. 1.

FIG. 6 is a left side elevational view of the illumination accessory illustrated in FIG. 1.

FIG. 7 is a left side elevational view of the illumination accessory, similar to FIG. 6, and shows a head portion of the accessory in a downwardly adjusted position.

FIG. 8 is a left side elevational view of the illumination accessory, similar to FIGS. 6 and 7, and shows the head portion and a neck portion of the accessory in a downwardly adjusted position.

DETAILED DESCRIPTION OF PREFERRED EMBODIMENTS

Figure 1:
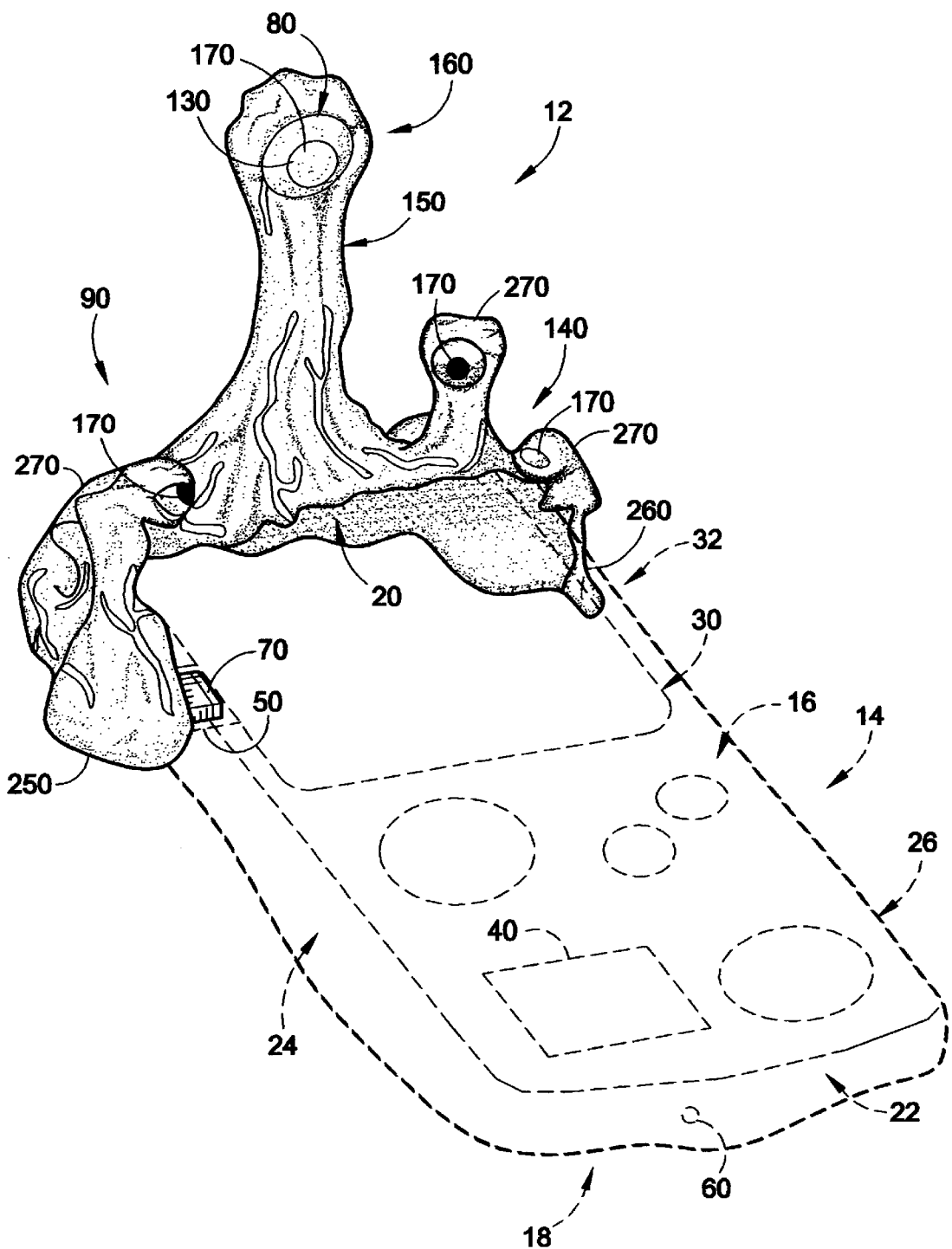
FIG. 1 is a perspective view of an illumination accessory for a handheld portable electronic or computing device such as a handheld video game device, in which the illumination accessory is shown with a handheld video game device.

With reference to FIG. 1, an embodiment of an illumination accessory or apparatus 12 for use with a portable electronic or computing device 14 such as, but not by way of limitation, the NINTENDO® GAME BOY® handheld video game device is shown. The illumination accessory 12 will be described below as an accessory for illuminating the screen of a handheld video game device. It will be readily apparent to those skilled in the art that the illumination accessory 12 may be used with portable handheld electronic or computing devices other than a handheld video game device such as, but not by way of limitation, Personal Digital Assistants (PDAs) (e.g., Palm Pilot™), digital cameras, internet cameras, video cameras, and cellular or internet phones. Further, the illumination accessory may be used for purposes other than illuminating the screen of the device such as, but not by way of limitation, illuminating a keyboard of the device, illuminating a subject of the device (e.g., when used with a camera), or illuminating an object used with the device.

In the embodiment shown, the portable handheld electronic or computing device is a handheld video game device 14 having a generally cuboid shape with six generally rectangular faces: a front face 16, a rear face 18, a top face 20, a bottom face 22, a left side face 24, and a right side face 26. A viewing or display screen 30 is located on the front face 16 in a top portion 32 of the device 14. The top portion 32 has a generally rectangular cross section that has generally the same dimensions as the top face 20. The display screen 30 may be a non-backlit, flat, liquid crystal display screen. Alternatively, the display screen 30 may be another type of display screen and/or a display screen that is ineffectively lit. The device 14 also includes a power source 40 in communication with a port 50 such as a communication port or power utility jack through electronic circuitry (not shown). In the case of the NINTENDO® GAME BOY®, the port is a communication port that has traditionally been used for communicating with other GAME BOY® devices for head-to-head video game competition. The inventors of the present invention recognized that in addition to being used for communication purposes, the port may be used for powering separate accessories. The inventors determined that the communication port of the GAME BOY® has a current level of approximately 20 ma at 5 volts (two 1.5 volt batteries). Exemplary power sources that may power the handheld video game device 14 include, but not by way of limitation, one or more alkaline batteries, rechargeable batteries, fuel cells, and an AC adapter. The AC adapter may plug into a wall outlet and supply power to the device 14 via a power port 60.

With reference to FIGS. 1, 3–5, 9, and 10, the illumination accessory 12 includes a plug 70 for plugging the illumination accessory 12 into the port 50 of the handheld video game device 14. The plug 6 mates with the port 50 to create a mechanical and electrical connection between the illumination accessory 12 and the device 14.

The illumination accessory 12 also includes an illumination device or source 80 and a body 90 that connects the illumination device 80 to the plug 70. When the illumination accessory is plugged into the port 50, the illumination device 80 is electrically connected to the port through the plug 70 and the body 90 so that the illumination device 80 is powered by the power source 40 when the device 14 is activated. The electrical connection between the illumination device 80 and the plug 70 can be established by any suitable means such as by a bendable and shapeable wire. It is especially preferred that the body 90 can be adjusted, when the accessory 12 is plugged into the port 50, to adjust the height and/or the angle of the illumination device 80 relative to the device 14.

The illumination device 8 is preferably a low power drawing light source. Low power drawing light source means a light that draws less than 20 ma, less than 3.6 volts. Preferably, the illumination device 8 includes one or more light emitting diodes ("LED"). Use of one or more LEDs is particularly advantageous in the present application because a LED draws very little electrical power during operation, is capable of being powered by a low current port, is small in size (reducing the size of the illumination accessory), has a long life, generates focused light, does not degrade or burn up after 1000 hours, emits little to no heat, and effectively lights the screen 30 of the device 14. Multiple LEDs may be included in the illumination accessory 12 because of their low power consumption.

The LED 9 is preferably a white 70-degree LED. A white LED 9 has the added advantage of being a full-spectrum light that brings out all the full, true colors generated on the screen 30.

Figure 2A:
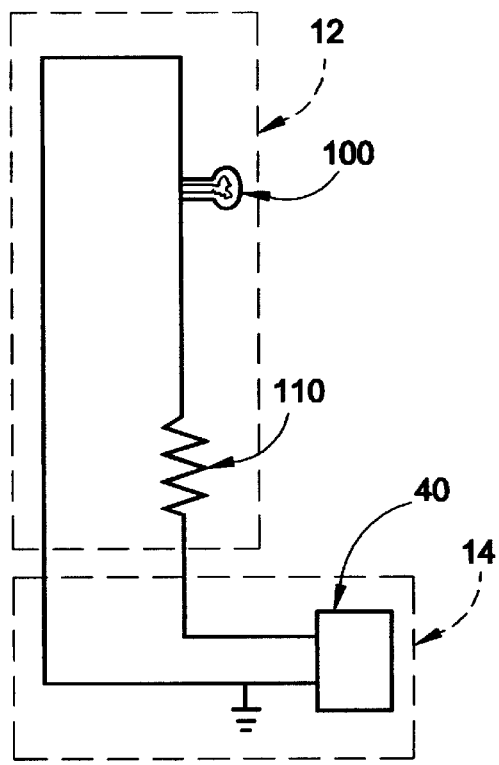
FIGS. 2A, 2B and 2C are respective electrical schematics of alternative embodiments of illumination accessories for handheld portable electronic or computing devices such as the handheld video game device illustrated in FIG. 1.
Figure 2B:
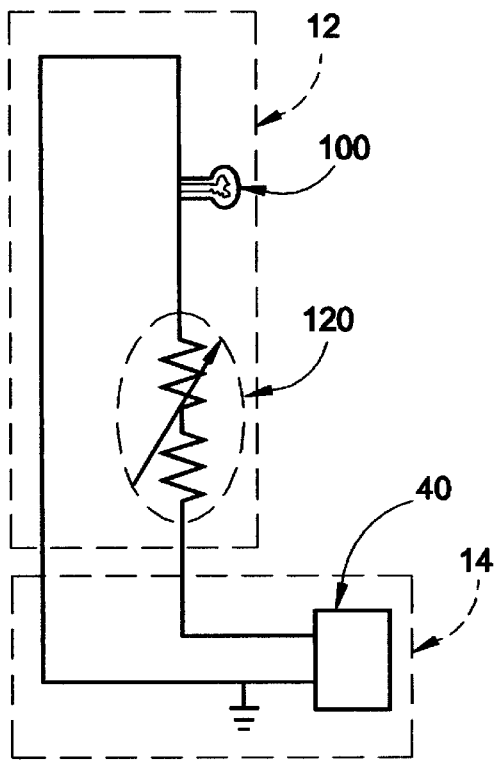
Figure 2C:
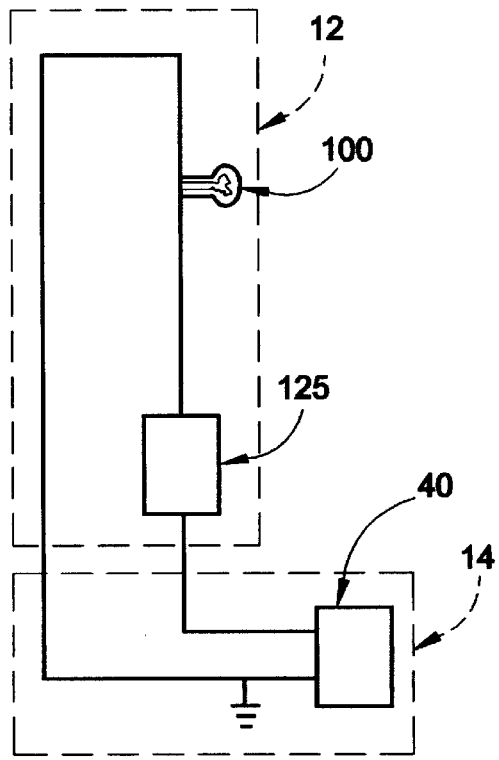

FIGS. 2A–2C are electrical schematics of alternative electrical circuit embodiments of the illumination accessory 12 and are shown in conjunction with a simplified electrical representation of the device 14. With reference to FIG. 2A, an embodiment of the illumination accessory 12 may include a LED 100 in circuit with a resistor 110. The resistor 110 is used to control the illumination of the LED 100 at a generally pre-selected illumination level. In another embodiment, the LED 100 may be selected so that a separate resistor 110 is not required, i.e., the resistor 110 shown represents the internal resistance of the LED 100. With reference to FIG. 2B, an additional embodiment of the illumination accessory 12 may include a LED 100 in circuit with a variable resistor 120. The variable resistor 120 functions as a dimmer mechanism or brightness control mechanism for manually controlling the brightness of the LED 100. The variable resistor 120 may be operatively associated with a control wheel (similar to a volume control wheel) or similar mechanism to control the brightness of the LED 100. With reference to FIG. 2C, a further embodiment of the illumination accessory 12 may include a LED 100 in circuit with a regulator 120. The regulator 120 is preferably a regulator circuit that supplies the LED 100 with a constant power level regardless of the input power level, which may vary, delivered from the device 14 to the accessory 12. In other embodiments of the illumination accessory 12, the accessory 12 may include one or more LEDs 100 in circuit with one or more of the elements described above with respect to FIGS. 2A–2C.

With reference back to FIG. 1, the body 90 may include a diffuser 130 adjacent to the lighting device 80 to break up and soften the narrow light of the LED, avoiding the production of "hot spots" and glare on the screen 30. The diffuser 14 may alternatively be replaced by a magnifier that focuses the light on the screen 30, rendering it easier to see the details of the screen 30. The magnifier focuses the light where it is needed, avoiding wasted light and optimizing the low power consumed by the LED 9. Another feature that may be included is a reflector (not shown) behind and around part of the LED for concentrating light toward the screen 30 while minimizing the back-scatter of light generated by the illumination device 80.

When the plug 70 of the illumination accessory 12 is plugged into the port 50 of the device 14, the plug 70 necessarily occupies the connection that the port 50 would otherwise allow to a user of the device 14. Because a user of the device 14 might need to connect some other device to the port 50, the plug 70 may be constructed so as to include a second communication port or utility jack (not shown). The second port is adapted to receive a second plug and provide a mechanical and electrical connection for the second plug equivalent to that which is provided by the port 50 of the device 14. Thus, the second port provides electrical communication for the, second plug with the port 50 when the second plug is plugged into the second port and the plug 70 is plugged into the port 50. In the case of the NINTENDO® GAME BOY®, the second port in the illumination accessory may be used for communicating with other GAME BOY® devices for head-to-head video game competition. Additionally, or alternatively, the second communication port may be used also to power other accessories.

The body 90 of the illumination accessory 12 is preferably constructed of a pliable plastic or rubber material that is removably mountable to the top portion 32 of the device 14. The body 90 includes a main body portion 140, a neck portion 150, and a head portion 160. The neck portion 150 and the head portion 160 define an appendage extending from the main body portion. In the embodiment shown, the body 90 is shaped in the form of a monster having multiple eyes 170. In other embodiments, the body 90 may have other monster or non-monster configurations.

Figure 3:
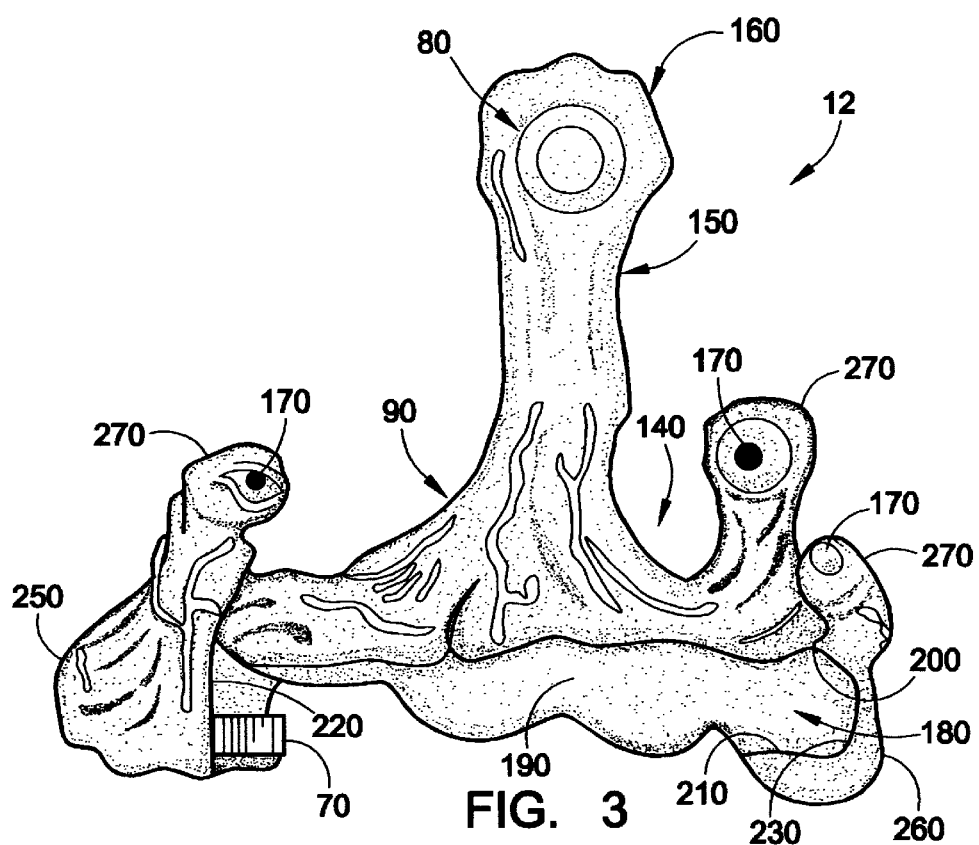
FIG. 3 is a front elevational view of the illumination accessory illustrated in FIG. 1.
Figure 4:
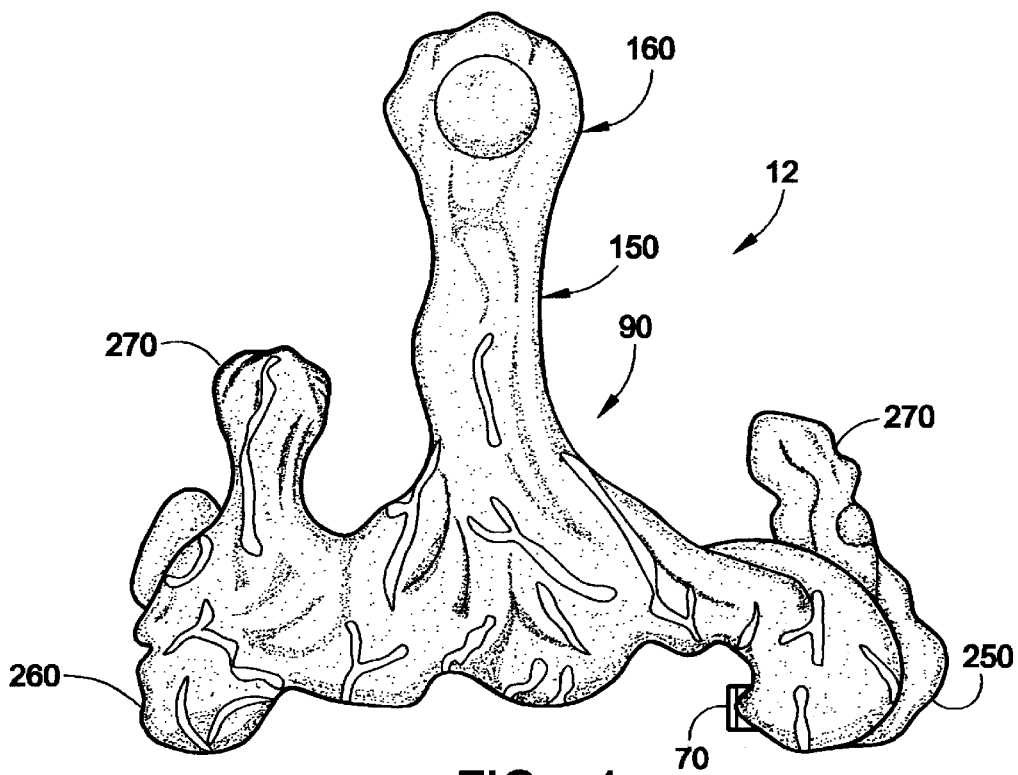
FIG. 4 is a rear elevational view of the illumination accessory illustrated in FIG. 1.
Figure 9:
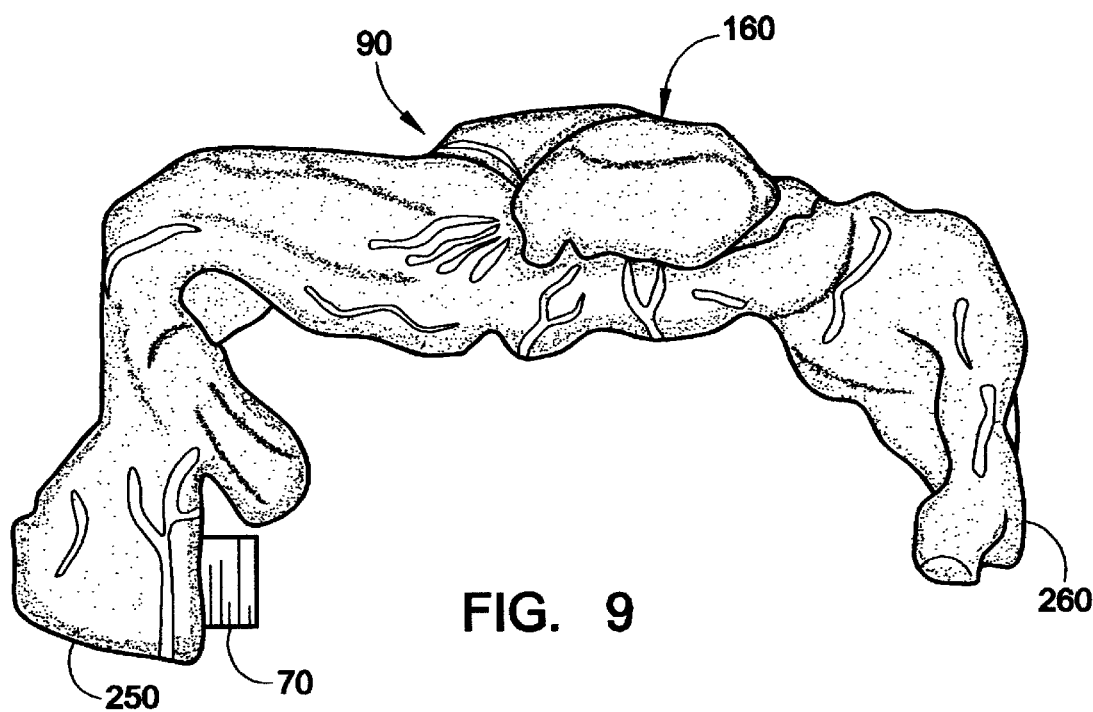
FIG. 9 is a top plan view of the illumination accessory illustrated in FIG. 1.
Figure 10:
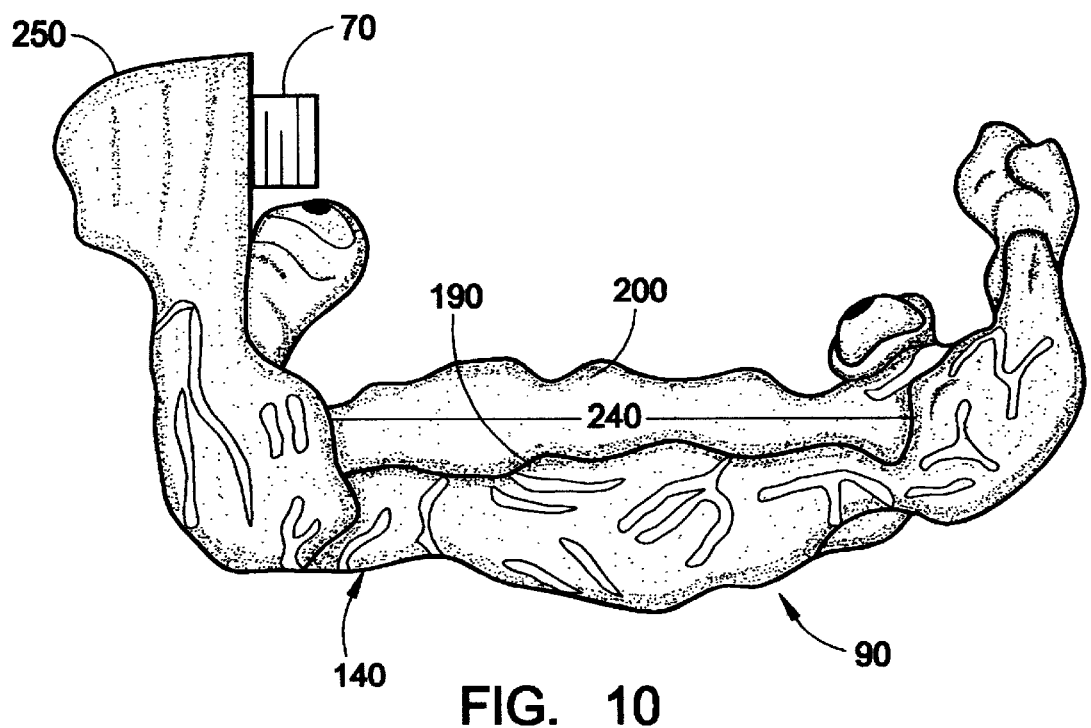
FIG. 10 is a bottom plan view of the illumination accessory illustrated in FIG. 1.

With reference to FIGS. 3 and 10, the main body portion 140 includes a recess 180 adapted to receive the generally rectangular top portion 32 of the device 14 for mounting the illumination accessory 12 to the device 14. The recess 180 is generally rectangular to match the generally rectangular top face 20 and generally rectangular cross section of the top portion 32 of the device 14. The recess 180 is defined by a rear wall 190, a top wall 200, a bottom wall 210, a left side wall 220 and a right side wall 230. The bottom wall 210 includes an opening 240 (FIG. 10) that is sized to allow video game cartridges of various thicknesses to be inserted into and removed from the device 14 when the illumination accessory 12 is mounted to the top portion 32 of the device. The left and right side walls 220, 230 are part of left and right side portions 250, 260 that overlap and wrap around left and right side faces 24, 26 of the device 14 when the illumination accessory 12 is mounted to the top portion 32 of the device 14. The rear wall 190 also abuts the top face 20 of the device 14 when the illumination accessory 12 is mounted to the top portion 32 of the device 14. The left side portion 250 preferably includes the plug 70.

Multiple appendages 270 may extend from the main body portion 140 of the illumination accessory. One or more of the appendages 270 may include a lighting device such as lighting device 80 described above at distal ends of the appendages 270, at eyes 170.

The wrap-around construction of the body 90 stabilizes the plug 70 by providing a structure that mounts to the device 14, preventing inadvertent dislodging of the plug 70. Moreover, the wrap-around construction adds structural integrity to the illumination accessory 12, thereby anchoring the position of illumination device 12 relative to the device 14. To add further structural integrity and rigidity to the body 90, a bendable, rigid wire similar to wire may run laterally through the body 90. The bendable wire may run from the plug 70 in the left side portion 250 to the right side portion 260. The bendable wire preferably runs from the main body portion 140 to the head portion 160. When the body 90 is bent to a desired position, the wire holds the adjusted position of the body 90, allowing the body 90 to better conform to the shape of the device 14.

With reference to FIGS. 7 and 8, the neck 150 may be bent downward toward the screen 30 and the head 160 may be pivoted downward with respect to the neck 150 to adjust the height and/or angle of the illumination device 80 in the head 160 relative to the device 14. Because the illumination accessory 12 has such a low profile when the neck 150 and head 160 are in the bent-down position shown in FIG. 8, it is preferable that the illumination device 80 include a wide angle LED 100, i.e., 25-degree LED or greater, such that the LED 100 casts light across the entire screen 30 when the neck 150 and head 160 are in the bent-down position.

The illumination accessory 12 will now be described in use. The illumination accessory may be attached to the device 14 by plugging the plug 70 into the port 50 and, then, inserting the top face 20 and top portion 32 of the device 14 into the recess 180 of the body 90. The main body portion 140, including the left and right side portions 250, 260, may be squeezed against the top portion 32 of the device 14 using the user's fingers to bend and conform the main body portion 32 to the top portion of the device 14. Alternatively, the top portion 32 of the device 14 may be inserted into the recess 180 before the plug 70 is plugged into the port 50. Once the illumination accessory 12 is mounted to the top portion 32 of the device 14, the neck 150 and/or head 160 may be adjusted to adjust the light device 80 relative to the screen 30 for optimal illumination of the screen 30.

It will be readily apparent to those skilled in the art that still further changes and modifications in the actual concepts described herein can readily be made without departing from the spirit and scope of the invention as defined by the following claims.

What is claimed is:

1. An apparatus for illuminating a display screen located in a top portion of a handheld portable video game device having a port in electrical connection with a power source, comprising:

a plug for plugging the apparatus into the port;

a body coupled to the plug, the body is detachably mounted to the top portion of the handheld portable video game device; and a light emitting diode ("LED") carried by the body and to be electrically connected to the port via at least the plug, the LED powered by the power source so as to illuminate the display screen of the handheld portable video game device when the apparatus is plugged into the port.

2. The apparatus of claim 1, wherein the handheld portable video game device has a top face, a left side face, and a right side face; and the body is adapted to mount to the top face, the left side face, and the right side face of the top portion of the handheld portable video game device when the apparatus is plugged into the port.

3. The apparatus of claim 1, wherein the body includes a bendable wire therein to allow the body to better conform to the top portion of the handheld portable video game device when the apparatus is plugged into the port.

4. The apparatus of claim 1, wherein the handheld portable video game device has a generally rectangular top face and the top portion has a generally rectangular cross section; and the body includes a generally rectangular recess adapted to receive the generally rectangular top face and generally rectangular top portion when the apparatus is plugged into the port.

5. The apparatus of claim 1, wherein the handheld portable video game device is adapted to receive video game cartridges in the top portion of the handheld portable video game device; and the body includes an opening sized to accommodate a video game cartridge in the top portion of the handheld portable video game device when the apparatus is plugged into the port.

6. The apparatus of claim 1, wherein a plurality of LEDs are attached to the body.

7. The apparatus of claim 6, wherein the body includes multiple appendages with respective distal ends, and the plurality of LEDs are located at the respective distal ends of the multiple appendages.

8. The apparatus of claim 1, wherein the LED is a white light diode.

9. The apparatus of claim 1, wherein the LED is a wide-angle LED.

10. The apparatus of claim 1, wherein the LED is a 70 degree LED.

11. The apparatus of claim 1, wherein the body includes a neck and a head, and the LED is located in the head.

12. The apparatus of claim 11, wherein both the head and neck are bendable for adjusting the LED relative to the screen.

13. The apparatus of claim 1, wherein the apparatus includes a brightness control mechanism to control the brightness of the LED.

14. The apparatus of claim 1, wherein the apparatus includes a resistor to control the brightness of the LED at a generally fixed brightness level.

15. The apparatus of claim 1, wherein the apparatus includes a regulator to deliver a generally fixed amount of power to the LED.

16. The apparatus of claim 1, wherein the apparatus includes a diffuser to diffuse the light from the LED.

17. The apparatus of claim 1, wherein the apparatus includes a member from the group consisting of a mirror or a magnifier to concentrate light from the LED onto the screen.

18. The apparatus of claim 1, wherein the plug includes a second port to receive a second plug that is in electrical communication with the port when the second plug is plugged into the second port and the plug is plugged into the port.

19. A method of illuminating a display screen of a top portion of a handheld portable video game device having a port in electrical connection with a power source, comprising:

providing an apparatus including a plug for plugging the apparatus into the port, a body coupled to the plug, the body adapted to be detachably mounted to the top portion of the handheld portable video game device, and a light emitting diode ("LED") carried by the body and to be electrically connected to the port via at least the plug;

coupling the plug of the apparatus with the port of the handheld portable video game device so as to power the LED;

mounting the body to the top portion of the handheld portable video game device;

illuminating the display screen of the handheld portable video game device with the LED.

20. The method of claim 19, wherein the handheld portable video game device has a top face, a left side face, and a right side face; and mounting the body to the top portion of the handheld portable video game device includes mounting the body to the top face,.the left side face, and the right side face of the top portion of the handheld portable video game device.

21. The method of claim 19, wherein the body includes a bendable wire therein to allow the body to better conform to the top portion of the handheld portable video game device, and mounting the body to the top portion of the handheld portable video game device includes bending the body with the bendable wire to conform the body to the top portion of the handheld portable video game device.

22. The method of claim 20, wherein the handheld portable video game device has a generally rectangular top face and the top portion has a generally rectangular cross section, the body includes a generally rectangular recess adapted to receive the generally rectangular top face and the generally rectangular top portion, and mounting the body to the top portion of the handheld portable video game device includes positioning the generally rectangular top face of the top portion of the handheld portable video game device within the generally rectangular recess of the body.

23. The method of claim 19, wherein the body includes an opening sized to accommodate the insertion or removal of a video game cartridge in the top portion of the handheld portable video game device, and the method further includes inserting or removing a video game cartridge in the top portion of the handheld portable video game device when the apparatus is plugged into the port and mounted to the top portion of the handheld portable video game device.

24. The method of claim 19, wherein a plurality of LEDs are attached to the body, and illuminating the display screen includes illuminating the display screen with the plurality of LEDs.

25. The method of claim 24, wherein the body includes multiple appendages with respective distal ends, and the plurality of LEDs are located at the respective distal ends of the multiple appendages.

26. The method of claim 19, wherein the LED is a white light diode.

27. The method of claim 19, wherein the LED is a wide-angle LED.

28. The method of claim 19, Wherein the LED is a 70 degree LED.

29. The method of claim 19, wherein the body includes a neck and a head with a bendable wire, the LED is located in the head, and the method further includes bending the neck and head to a desired position for lighting the screen.

30. The method of claim 19, wherein the apparatus includes a brightness control mechanism to control the brightness of the LED, and the method further includes adjusting the brightness of the LED.

31. The method of claim 19, wherein the apparatus includes a resistor to control the brightness of the LED at a generally fixed brightness level.

32. The method of claim 19, wherein the apparatus includes a regulator to deliver a generally fixed amount of power to the LED.

33. The method of claim 19, wherein the apparatus includes a resistor to control the brightness of the LED at a generally fixed brightness level.

34. The method of claim 19, wherein the apparatus includes a diffuser to diffuse the light from the LED.

35. The method of claim 19, wherein the apparatus includes a member from the group consisting of a mirror or a magnifier to concentrate the light from the LED onto the screen.

36. The method of claim 19, wherein the plug includes a second port to receive a second plug that is in electrical communication with the port when the second plug is plugged into the second port and the plug is plugged into the port, the method further including plugging a second plug into the second port for powering or communicating a separate accessory with the handheld portable video game device.

37. The apparatus of claim 1, wherein the apparatus includes a reflector to reflect light from the LED onto the display screen.

38. The apparatus of claim 37, wherein the reflector is adapted to concentrate light toward the display screen.

39. The apparatus of claim 11, wherein the head is bendable for moving the LED relative to the display screen.

40. The apparatus of claim 11, wherein the neck is bendable for moving the LED relative to the display screen.

41. The method of claim 19, wherein the apparatus includes a reflector to reflect light from the LED onto the display screen.

42. The method of claim 41, wherein the reflector is adapted to concentrate light toward the display screen.

43. An apparatus for illuminating a display screen of a handheld portable video game device having a top portion and a port in electrical connection with a power source, comprising:
   a plug for plugging the apparatus into the port;
   a body coupled to the plug, the body is detachably mounted to the top portion of the handheld portable video game device; and
   an illumination device carried by the body and to be electrically connected to the port via at least the plug, the illumination device powered by the power source so as to illuminate the display screen of the handheld portable video game device when the apparatus is plugged into the port.

44. The apparatus of claim 43, wherein the illumination device is a LED.

45. The apparatus of claim 43, wherein the top portion of the handheld portable video game device has opposite corners, and the body is adapted to be detachably mounted to a corner of the top portion of the handheld portable video game device.

46. The apparatus of claim 45, wherein the body includes a rear wall, a top wall, a bottom wall, and a side wall adapted to be to be detachably mounted to a corner of the top portion of the handheld portable video game device.

47. The apparatus of claim 45, wherein the apparatus includes a second port to receive a second plug that is in electrical communication with the port when the second plug is plugged into the second port and the plug is plugged into the port.

48. An apparatus for illuminating a display screen of a handheld portable video game device having a top portion with opposite corners and a port in electrical connection with a power source, comprising:
   a plug for plugging the apparatus into the port;
   a body coupled to the plug, the body including a rear wall, a top wall, a bottom wall, and a side wall wherein the body is detachably mounted to a corner of the top portion of the handheld portable video game device; and
   an illumination device carried by the body and to be electrically connected to the port via at least the plug, the illumination device powered by the power source so as to illuminate the display screen of the handheld portable video game when the apparatus is plugged into the port.

49. The apparatus of claim 48, wherein the illumination device is a LED.

50. The apparatus of claim 48, wherein the apparatus includes a second port to receive a second plug that is in electrical communication with the port when the second plug is plugged into the second port and the plug is plugged into the port.

51. An apparatus for illuminating a display screen of a handheld portable video game device, the handheld portable video game device having multiple faces and a port extending from one of the multiple faces, the port in electrical connection with a power source, comprising:
   a plug for plugging the apparatus into the port, a flat wall extending laterally from the plug and adapted to be generally parallel with the face of the handheld portable video game device that the port extends from when the plug is plugged into the port;
   a body coupled to the plug; and
   an illumination device carried by the body and to be electrically connected to the port via at least the plug, the illumination device powered by the power source so as to illuminate the display screen of the handheld portable video game device when the apparatus is plugged into the port.

52. The apparatus of claim 51, wherein the illumination device is a LED.

53. The apparatus of claim 51, wherein the apparatus includes a second port to receive a second plug that is in electrical communication with the port when the second plug is plugged into the second port and the plug is plugged into the port.

* * * * *